(12) United States Patent
Doherty

(10) Patent No.: US 6,815,641 B2
(45) Date of Patent: Nov. 9, 2004

(54) HANDLE FOR WELDING GUN AND SYSTEM USING SAME

(75) Inventor: James E. Doherty, Barrington, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/041,009

(22) Filed: Jan. 7, 2002

(65) Prior Publication Data

US 2003/0127443 A1 Jul. 10, 2003

(51) Int. Cl.[7] .............................................. B23K 9/00
(52) U.S. Cl. ........................ 219/137.31; 219/137.63; 219/144
(58) Field of Search ................. 219/137.31, 137.63, 219/144

(56) References Cited

U.S. PATENT DOCUMENTS

| | | | | |
|---|---|---|---|---|
| 2,104,750 A | * | 1/1938 | Jones ........................ | 219/138 |
| 3,689,733 A | * | 9/1972 | Matasovic ............. | 219/137.63 |
| 4,250,366 A | * | 2/1981 | Erickson et al. ......... | 200/332.2 |
| 4,403,136 A | * | 9/1983 | Colman ................ | 219/137.31 |
| 4,954,690 A | * | 9/1990 | Kensrue ............... | 219/137.31 |
| 5,132,513 A | * | 7/1992 | Ingwersen et al. ..... | 219/137.31 |
| 5,260,546 A | | 11/1993 | Ingwersen et al. ..... | 219/137.31 |
| 5,338,917 A | | 8/1994 | Stuart et al. ........... | 219/137.63 |
| 5,491,321 A | * | 2/1996 | Stuart et al. ........... | 219/137.61 |
| 5,571,427 A | * | 11/1996 | Dimock et al. ............... | 219/75 |
| 5,965,045 A | * | 10/1999 | Zigliotto ............... | 219/137.31 |
| 6,025,574 A | * | 2/2000 | Colangelo, Jr. ........ | 219/137.31 |
| 6,225,599 B1 | * | 5/2001 | Altekruse .............. | 219/137.31 |
| 6,534,747 B1 | * | 3/2003 | Rehrig .................. | 219/137.31 |
| 6,649,858 B2 | * | 11/2003 | Wakeman .................. | 219/73.2 |
| 2003/0015510 A1 | | 1/2003 | Wakeman .............. | 219/137.31 |

FOREIGN PATENT DOCUMENTS

| JP | 52098647 A | 2/1976 | ........... B23K/9/173 |
|---|---|---|---|
| RU | 2030263 C1 | 12/1990 | ........... B23K/9/26 |

OTHER PUBLICATIONS

U.S. 2003/0015510 A1 Wakeman (Jan. 23, 2003—09/907,010 filed Jul. 17, 2001).*

* cited by examiner

Primary Examiner—Kiley Stoner
Assistant Examiner—Kevin P. Kerns
(74) Attorney, Agent, or Firm—Fletcher Yoder

(57) ABSTRACT

A welding system having a welding gun with a handle. The handle has a first end and a second end. The handle may be operable to receive a welding cable from a first and a second direction, respectively. The handle may be operable to position a trigger in any one of four quadrants of the handle. The handle may increase in cross-sectional area in each direction from a gripping portion located between the first and second ends towards the first and second ends.

30 Claims, 6 Drawing Sheets

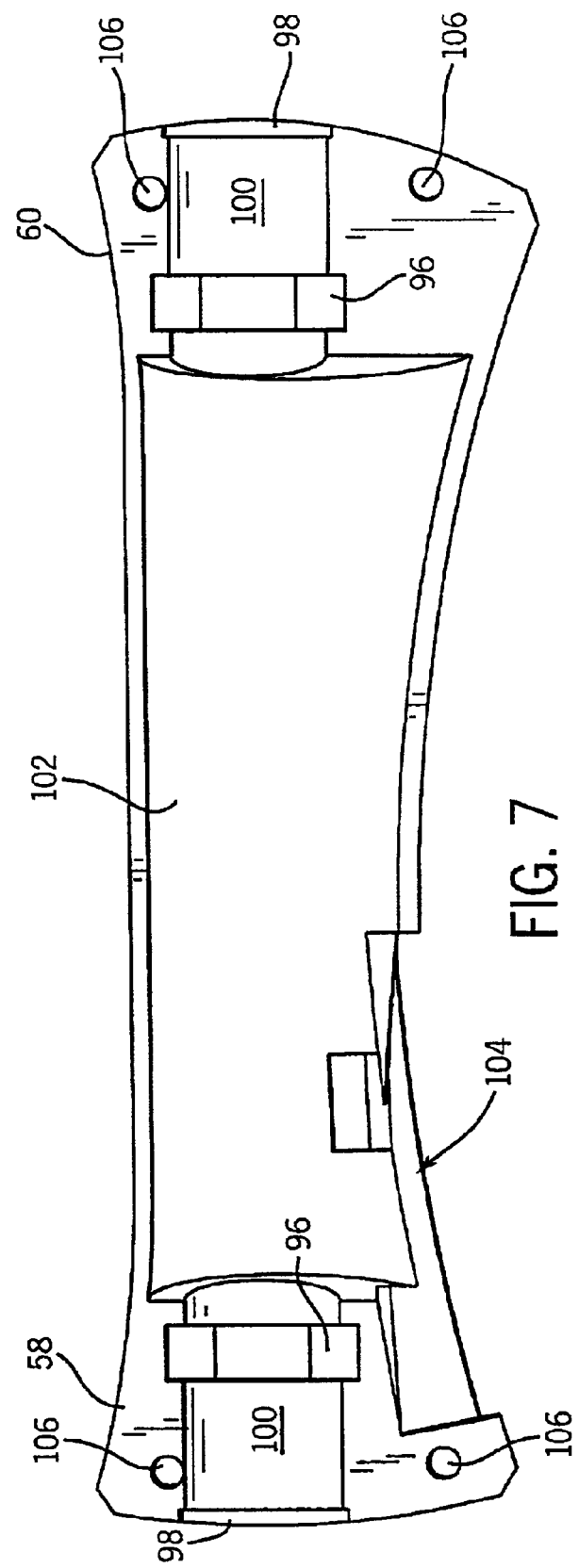

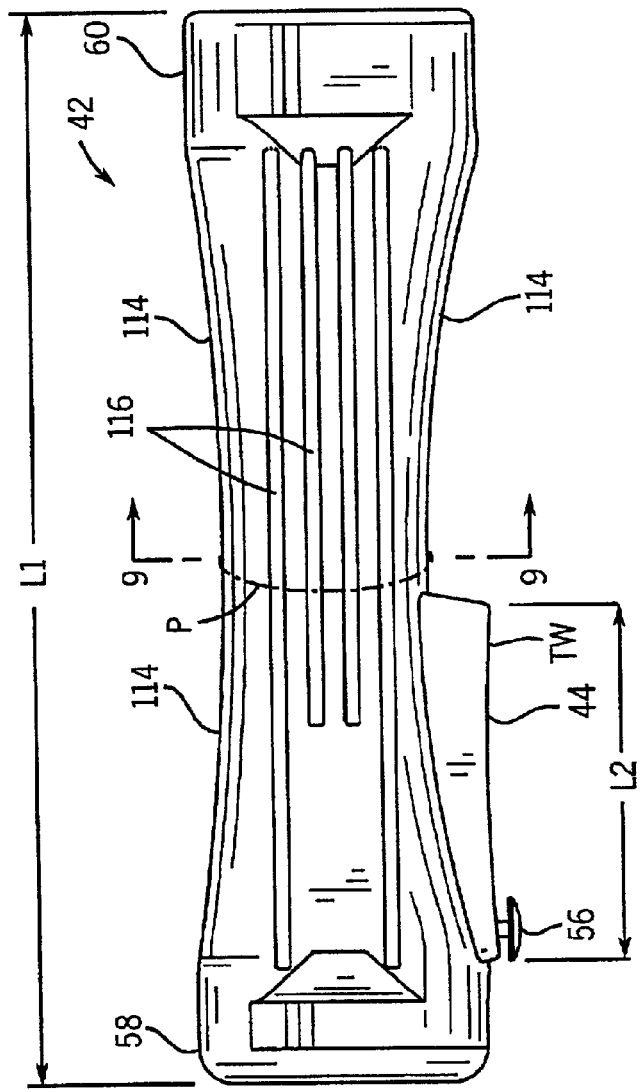
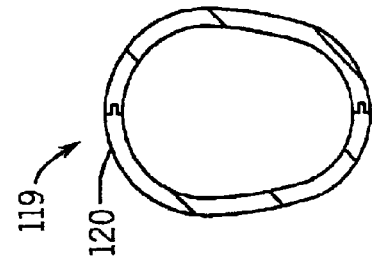
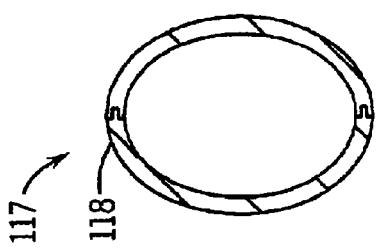
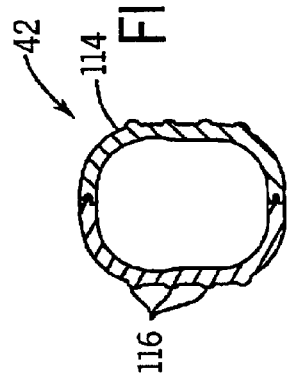

__US 6,815,641 B2__

HANDLE FOR WELDING GUN AND SYSTEM USING SAME

FIELD OF THE INVENTION

The present invention relates generally to welding systems, and particularly to a welding system having a welding gun.

BACKGROUND OF THE INVENTION

Welding is a method of joining pieces of metal together into one solid piece. Welding guns are used in a number of different types of welding. An arc welding system typically comprises an electric power supply coupled to an electrode. Welding guns are used to direct the electrode to the appropriate spot on the material to be welded. A conductive cable and a clamp for securing the conductive cable to the metal piece to be welded provide a return path to the electric power supply. The electrode in the welding gun, along with the metal piece and conductive cable, completes an electrical circuit with the power supply when the electrode is placed against the metal piece. The contact between the electrode and the metal piece produces an electric arc between the electrode and the metal piece. The heat of the electric arc is concentrated on the metal piece, or pieces, to be joined. The arc melts the metal piece, or pieces, in the vicinity of the point of contact. A filler material may be added to the molten metal. As the electrode is moved, the molten mass behind the electrode cools and solidifies.

MIG (Metal Inert Gas) welding is one type of arc welding. MIG welding is also referred to as "wire-feed" or GMAW (Gas Metal Arc Welding). In MIG welding, a metal wire is used as the electrode to produce the arc. The weld area and the wire are shielded by an inert gas and the metal wire acts as the filler for the weld. The inert gas is used to shield the electric arc and the heated metal of the workpiece from outside contaminants and gases that may react with the weld.

Typically, the wire and gas are fed through a hand-held welding gun. The wire and gas are fed to the welding gun from a wire feeder. The wire feeder is, in turn, coupled to a power source and a source of gas, such as a gas cylinder. The welding gun is used to direct the wire and gas to a desired location for welding. The welding gun, typically, has a switch, or trigger, that is coupled to the wire feeder. When the trigger is operated, gas and wire are fed through the gun from the wire feeder.

A typical welding gun has a handle, a cable, a trigger, and a neck. Wire, gas, or flux are directed to the workpiece through the cable, handle, and neck. A user grips the handle and positions the handle so that the wire, gas, or flux are directed to the desired location when the trigger is operated. However, different users have different preferences when it comes to holding the welding handle and operating the trigger. For example, some users may prefer operating the trigger with their index finger, while others prefer operating the trigger with their thumb or the palm of their hand.

However, current welding guns do not have the flexibility to enable a user to configure a welding gun to their own ergonomic preferences. For example, current welding guns do not enable a user to change the orientation of the trigger to the welding handle. There exists then a need for a welding handle that enables a user to configure a welding gun for the user's own ergonomic preferences.

SUMMARY OF THE INVENTION

The present technique provides a handle, welding gun, welding system, and method of assembly of a welding gun designed to respond to such needs. According to one aspect of the present technique, a welding system also is featured. The system may be a MIG welding system, or some other type of welding system. The welding system features a power source and a welding gun coupleable to the power source. The welding gun has a handle. The handle has a first end that is operable to receive the cable from a first direction. The first end also is operable to secure the cable to the handle. The handle also has a second end that is opposite to the first end. As with the first end, the second end is operable to receive the cable from a second direction and to secure the cable to the handle. The welding system may comprise a wire feeder to feed electrode wire to the welding gun.

A welding system also is featured, according to another aspect of the present technique. The system may be a MIG welding system, or some other type of welding system. The welding system features a power source and a cable coupleable to a welding gun from the power source. The welding gun has a handle. The handle has a first end and a second end. The handle increases in cross-sectional area from a gripping portion located between the first and second ends in each direction towards the first and second ends.

According to another aspect of the present invention, a welding handle kit is featured. The welding handle kit enables an existing welding system to be configured with a welding handle adapted according to other aspects of the present technique described herein.

BRIEF DESCRIPTION OF THE DRAWINGS

The invention will hereafter be described with reference to the accompanying drawings, wherein like reference numerals denote like elements, and:

FIG. 7 is a front elevational view of the interior of a welding handle piece;

FIG. 8 is a front elevational view of the welding handle;

FIG. 9 is a cross-sectional view of the welding gun, taken generally along line 9—9 of FIG. 8, according to an exemplary embodiment of the present invention;

FIG. 10 is a cross-sectional view of the welding gun, taken generally along line 9—9 of FIG. 8, according to another exemplary embodiment of the present invention; and FIG. 11 is a cross-sectional view of the welding gun, taken generally along line 9—9 of FIG. 8, according to still another exemplary embodiment of the present invention.

DETAILED DESCRIPTION OF THE PREFERRED EMBODIMENTS

Figure 1:
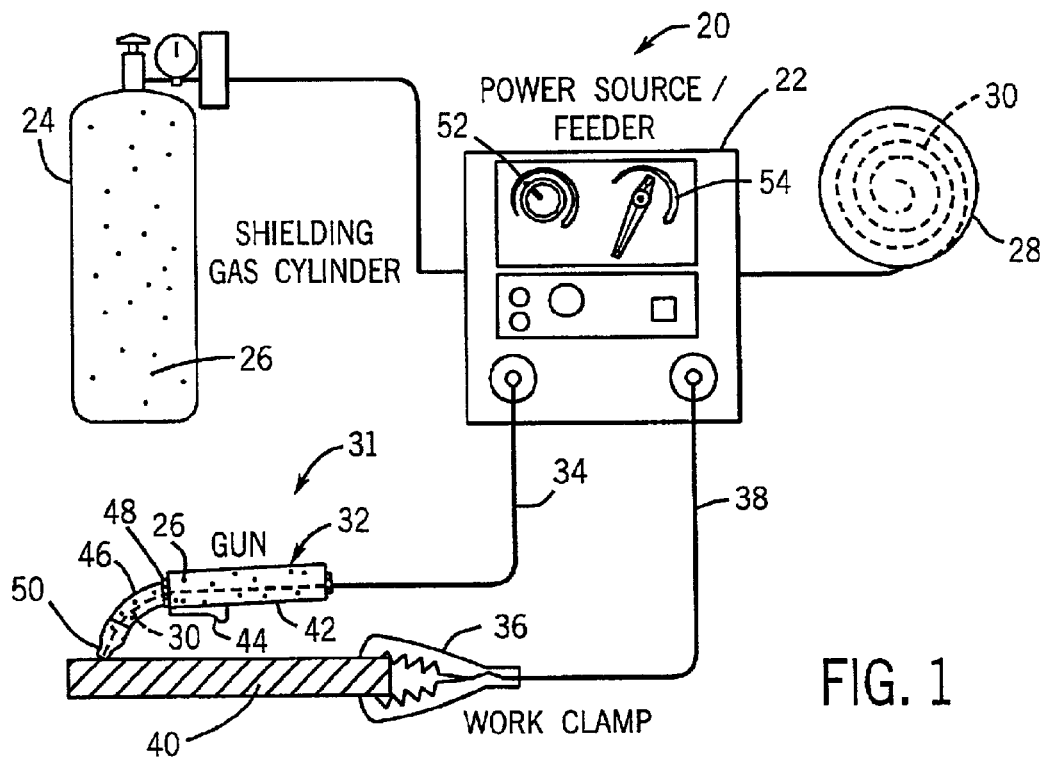
FIG. 1 is a diagram of a welding system, according to an exemplary embodiment of the present technique.

Referring generally to FIG. 1, an exemplary wire-feed metal inert gas ("MIG") welding system 20 is illustrated.

However, the present invention is operable with a variety of welding systems, such as a stick electrode welding system. The illustrated MIG welding system 20 comprises a power source/wire feeder 22, a gas cylinder 24 containing a gas 26 that is coupled to the power source/wire feeder 22, a spool 28 of electrode wire 30 that is coupled to the power source/wire feeder, a welding gun 31 comprising a configurable welding handle assembly 32 and a welding cable 34, a work clamp 36, and a return cable 38.

The power source/wire feeder 22 is a source of electric power and directs the feeding of gas 26 and wire 30 to the welding cable 34. The welding cable 34 is operable to route gas 26 and wire 30 from the power source/wire feeder 22 to the welding handle assembly 32. The work clamp 36 is clamped onto the conductive workpiece 40 to be welded. The work clamp 36 and the return cable 38 electrically couple the power source/wire feeder 22 to the workpiece 40.

Figure 2:
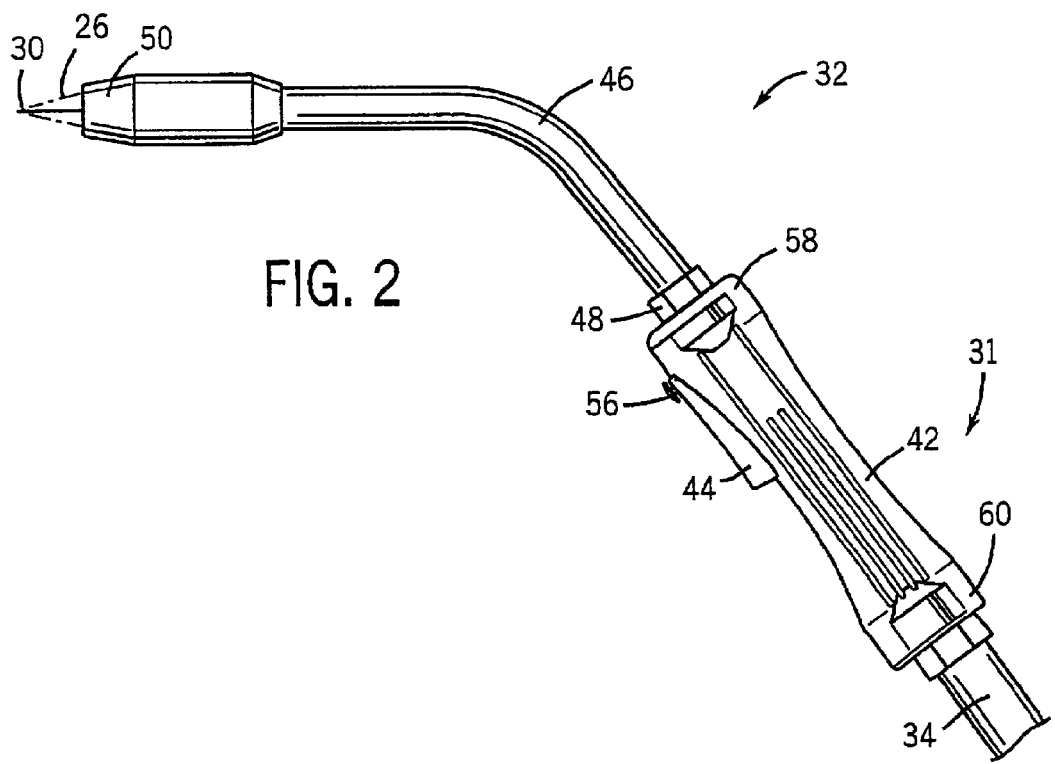
FIG. 2 is a front elevational view of a welding gun configured with the welding handle and trigger in a first orientation.

Referring generally to FIGS. 1 and 2, the welding gun 31 is used to direct the wire to the workpiece 40 and to control the application of gas 26 and wire 30 from the power source/wire feeder 22 to the workpiece 40. An electrical circuit between the power source/wire feeder 22 and the workpiece 40 is completed when the trigger 44 is operated and the electrode wire 30 is touched to the workpiece 40. Electricity flows from the power source 22 through the welding gun 31 workpiece 40, clamp 36, and return cable 38, producing an arc at the workpiece 40. The electric arc produces heat that melts the workpiece 40 in a region surrounding the point of contact between the wire 30 and the workpiece 40. The wire also acts as filler material. The heat of the arc melts the wire 30 as the arc is moved over the workpiece 40. The inert gas 26 forms a shield that prevents harmful chemical reactions from occurring at the weld site. When the arc is removed, the pool of molten material solidifies, forming the weld.

Figure 6:
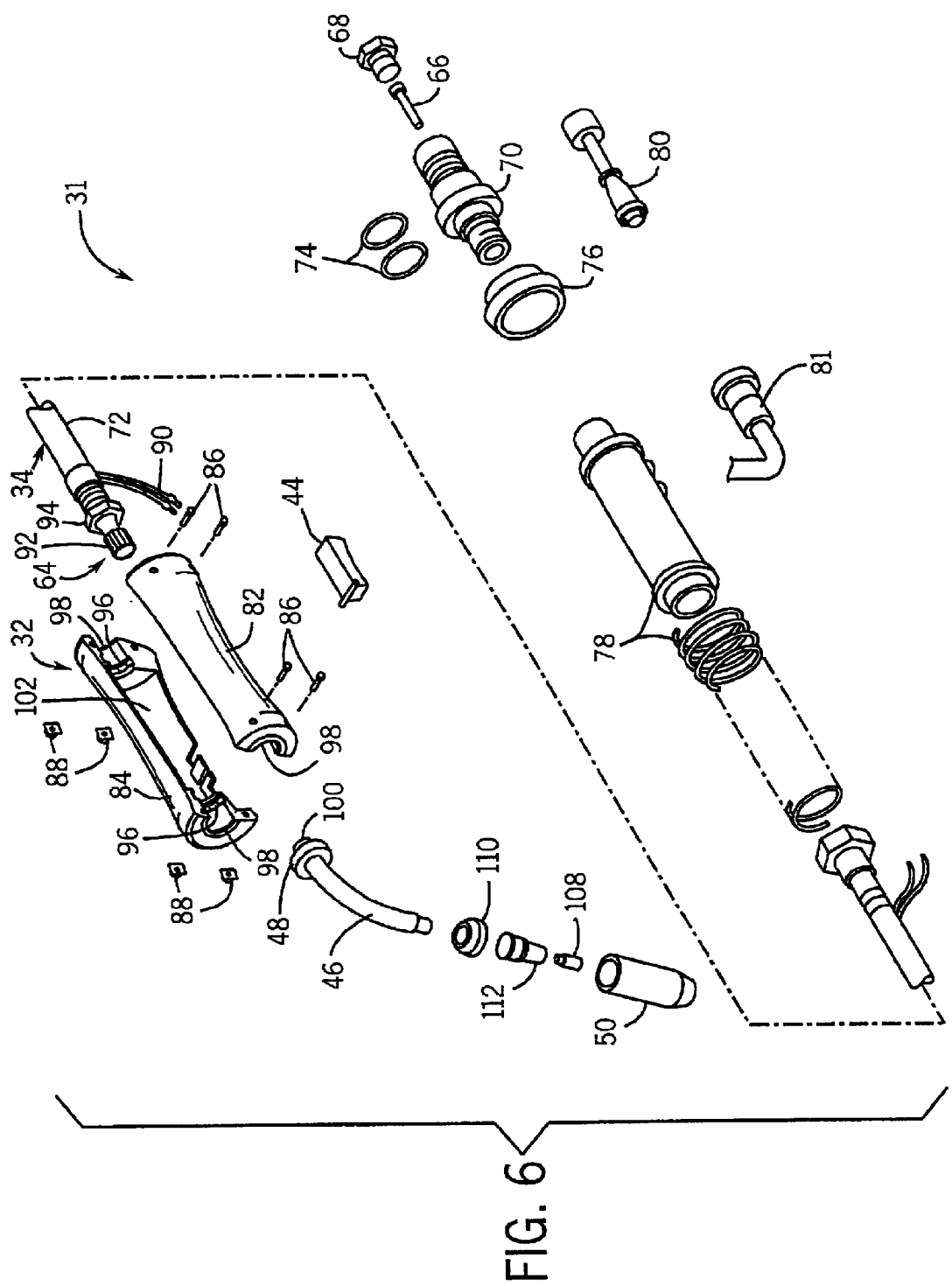
FIG. 6 is an exploded view of the welding gun of FIGS. 2–5.

The welding handle assembly 32 comprises a handle 42, a trigger 44, a neck 46, a retaining nut 48, and a nozzle 50. The welding cable 34 also has an electrical cable (not shown) that is electrically coupleable to the trigger 44 and the power source/wire feeder 22. The trigger 44 enables a user to control the supply of gas 26, wire 30, and power from the power source/wire feeder 22. A number of events occur when the trigger 44 is operated. One event is that the power source/wire feeder 22 draws in wire 30 from the wire spool 28 and feeds it though the welding cable 34 to the welding handle assembly 32. Additionally, gas 26 from the gas cylinder 24 flows through the welding cable 34 to the welding handle assembly 32. Also, electric power from the power source/wire feeder 22 is supplied to the wire 30. The wire 30 and gas 26 are then fed through the neck 46 towards the workpiece 40. The nozzle 50 directs the gas 26 towards the workpiece 40. As best illustrated in FIG. 6, a tip 108 directs the wire towards the workpiece 40. When the trigger 44 is released, gas 26, wire 30, and electrical power are no longer fed to the welding gun 31.

Referring again to FIG. 1, the power source/wire feeder 22 may be a single combined unit or, alternatively, the power source/feeder may be comprised of a separate power source and a separate wire feeder that are coupled together. Additionally, the power source/wire feeder 22 may have a variety of different features. For example, the power source/wire feeder 22 may have a wire speed control 52 to enable a user to control the speed at which wire 30 is fed from the power source/wire feeder 22. Additionally, a power source/feeder may have a variable voltage and/or current control 54 to enable a user to control the voltage and/or current produced by the power source. The power source/wire feeder 22 also may have standard features.

Referring generally to FIGS. 2–5, the welding gun 31 is configured so that the trigger 44 may be located in each of four quadrants of the handle 42. In the view of the welding gun 31 in FIGS. 2–5, the welding gun 31 is illustrated in a variety of configurations for welding a workpiece. However, these are not exclusive examples of available configurations of the welding gun 31. For example, the neck 46 may be oriented to direct wire and gas upward, rather than downward as illustrated in these views.

In the illustrated embodiments, the welding gun 31 has a trigger lock assembly 56 that is operable to hold the trigger 44 engaged. However, the trigger lock assembly 56 is ooptional. A number of different types of trigger lock assemblies 56 may be used. In addition, the orientation of the trigger lock assembly 56 to the trigger 44 may vary. Additionally, the trigger 44 may be operated with different portions of a hand. In the illustrated embodiments, the welding handle 42 has a first end 58 and a second end 60, which are both operable to receive the neck 46 and the cable 34. In FIG. 2, the welding gun 31 has been configured so that the trigger 44 is located on the bottom portion of the welding handle 42 near the neck 46 in a first quadrant of the handle 42. The neck 46 is secured to the first end 58 of the handle 42 and the cable 34 is received via the second end 60 of the handle 42. This orientation places the trigger 44 closer to the neck 46 than to the welding cable 34. This orientation, for example, enables a user to grasp the handle 42 and operate the trigger 44 with their forefinger.

Figure 3:
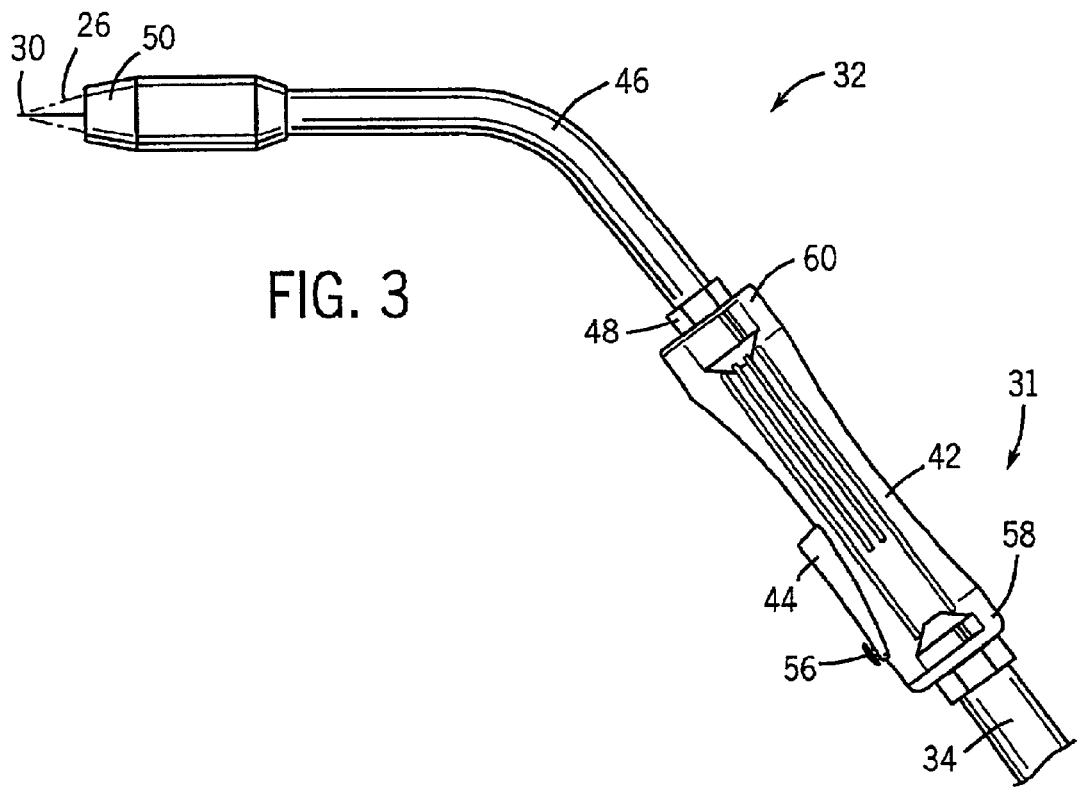
FIG. 3 is a front elevational view of a welding gun configured with the welding handle and trigger in a second orientation.

In FIG. 3, the welding gun 31 also has been configured so that the trigger 44 is located on the bottom portion of the welding handle 42 in a second quadrant of the handle 42. In the illustrated embodiment, the neck 46 is secured to the second end 60 of the handle 42 and the cable 34 is received via the first end 58 of the handle 42. This orientation places the trigger 44 closer to the cable 34 than the neck 46. This enables a user, for example, to grasp the handle 42 and operate the trigger 44 with their ring finger or little finger.

Figure 4:
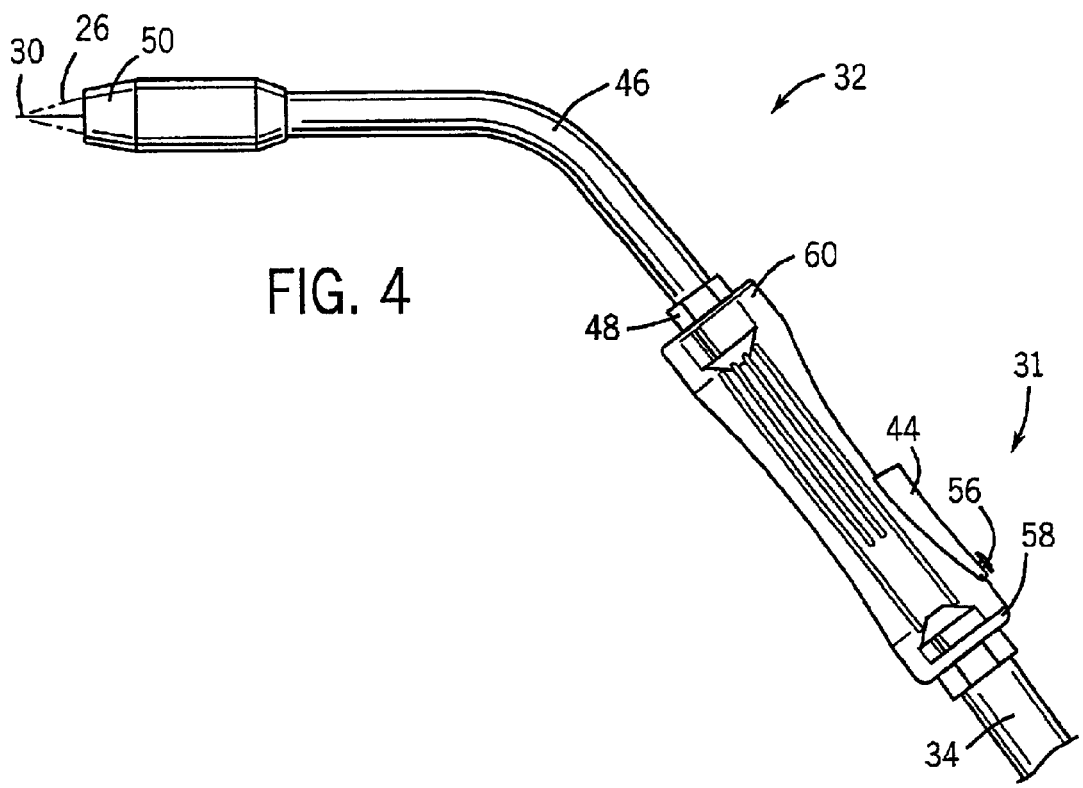
FIG. 4 is a front elevational view of a welding gun configured with the welding handle and trigger in a third orientation.

In FIG. 4, the welding gun 31 has been configured so that the trigger 44 is located on the top portion of the welding handle 42 in a third quadrant of the handle 42. In the illustrated embodiment, the neck 46 is secured to the second end 60 of the handle 42 and the cable 34 is received via the first end 58 of the handle 42. This orientation places the trigger 44 nearer the cable 34 than to the neck 46, but on the top of the handle 42. This orientation, for example, enables a user to grasp the handle 42 and operate the trigger 44 with the palm of their hand.

Figure 5:
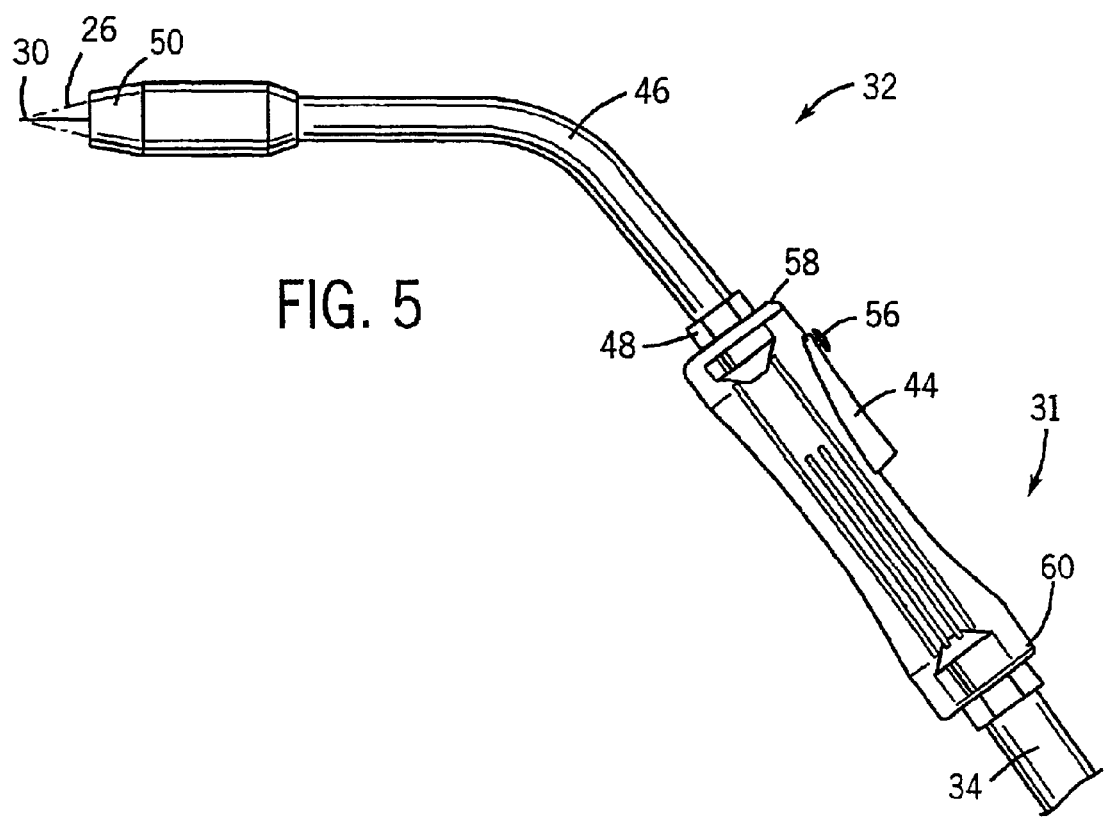
FIG. 5 is a front elevational view of a welding gun configured with the welding handle and trigger in a fourth orientation.

In FIG. 5, the welding gun 31 also has been configured so that the trigger 44 is located on the top portion of the welding handle 42 in a fourth quadrant of the handle 42. In the illustrated embodiment, the neck 46 is secured to the first end 58 of the handle 42 and the cable 34 is received via the second end 60 of the handle 42. This orientation places the trigger 44 closer to the neck 46 than to the cable 34. This orientation, for example, also enables a user to grasp the handle 42 and operate the trigger 44 with the palm of their hand, but use a different portion of the palm of the hand from the portion that would be utilized with the orientation of FIG. 4.

Referring generally to FIG. 6, the welding gun 31 may be reconfigured to a different desired configuration. In the illustrated embodiment, the welding cable 34 has a connector assembly 64 that couples the welding cable 34 to the neck 46. Electrode wire 30 from the welding cable 34 is fed into the connector assembly 64 through a liner 66. The liner 66 aligns the wire 30 through the cable 34 up to the tip 108.

Gas 26 also flows through the interior of the welding cable 34. In the illustrated embodiment, a locking nut 68 is used to secure the liner 66 to an adaptor plug 70. The liner 66 may be replaced by disconnecting the locking nut 68 from the adaptor plug 70 to access the liner 66. The outer portion 72 of the welding cable 34 is inserted over a portion of adaptor plug 70. In the illustrated embodiment, O-rings 74 are used to maintain a seal between adaptor plug 70 and outer portion 72 of welding cable 34. A retaining nut 76 is used to secure a support housing and support spring assembly 78 to the plug adaptor 70. A trigger cable adaptor 80 and trigger/switch electrical cord 81 are used to electrically couple the trigger 44 to the welding cable 34.

In the illustrated embodiment, the welding handle 42 is comprised of a left handle portion 82 and a right handle piece 84. The left and right handle pieces are secured to each other by a plurality of screws 86, nuts 88, and snaps. In the illustrated embodiment, the left and right handle pieces are secured together around the welding cable 34. The neck 46 is secured to the welding handle 42 by the retaining nut 48. Additionally, electrical control leads 90 are used to electrically couple the trigger 44 to the trigger/switch electrical cord 81 that is coupled to the power source/wire feeder 22. This enables the trigger 44 to control the operation of the power source/wire feeder 22.

In the illustrated embodiment, the welding cable 34 has a coupling end 92 and a hex nut 94. The coupling end is operable to couple the welding cable 34 to the neck 46. As best illustrated in FIG. 7, each end of the left and right handle pieces has a recess 96 that is adapted to receive the hex nut 94. When the left and right handle pieces are secured together, the hex nut 94 and, thus, the welding cable 34, are secured in place within the welding handle assembly 32. The ends of the left and right handle pieces are adapted to form an opening 98 to accept the welding cable 34 at each end of the weldinghandle 42. The ends of the left and right handle pieces are adapted to form entry passageways 100 for the welding cable 34 or neck 46 to enter the welding handle 42. A central chamber 102 is used to house the welding cable and the trigger connections. Additionally, the left and right handle pieces have trigger portions 104 adapted to receive the trigger 44. In this embodiment, each handle 42 has four screw holes 106 for passage of the screws 86 through each handle piece.

Referring again to FIG. 6, in the illustrated embodiment, the welding gun also comprises a tip 108, an insulator 110, and a diffuser 112. The tip 108 is used to direct the wire 30. The insulator 110 is used to prevent electricity in the wire 30 from flowing through the neck 46 to the welding handle 42, causing a short-circuit of the system. The diffuser 112 is used to establish the desired flow characteristics of the gas 26, for example, pressure, coverage pattern, velocity, etc. The nozzle 50 is used to direct the gas 26 to the workpiece 40.

Referring generally to FIG. 8, the illustrated embodiment of the welding handle 42 is adapted with an outer gripping surface 114. In the illustrated embodiment, the welding handle 42 increases in cross-sectional area from the approximate center of the welding handle 42 towards the first and second ends of the welding handle 42. Potential users of the welding gun 31 will have many different hand sizes. The increasing cross-sectional area of the handle 42 enables users with different hand sizes to grip the welding handle 42 at a location on the welding handle 42 with the thickness that is most comfortable for them. Additionally, the narrowest portion of the welding handle may be at a location other than the approximate center of the welding handle 42. Additionally, in this embodiment, the welding handle 42 has a plurality of ribs 116 extending along the outer surface 114. The ribs 116 assist a user in gripping the welding handle 42.

It has been found that a straight welding handle 42, as in the illustrated embodiment, is preferred by users. However, the welding handle may be curved. If the welding handle 42 is curved, it is preferable that the welding handle 42 be curved to less than 32 degrees. Preferably, the welding handle 42 is either oval or teardrop shaped. It is preferred that the perimeter, P, of the handle be less than 5.12 inches. It has been found that for ergonomic reasons, the preferred range of the perimeter is between 4.2 and 4.6 inches, with the optimal perimeter, P, of the welding handle 42 being 4.4 inches. Also, it has been found for ergonomic reasons that it is preferred that the length, L1, of the welding handle 42 be between 6.38 and 9.50 inches long and that the optimal length, L1, of the welding handle 42 is 8.00 inches long. It is also preferred ergonomically that the welding handle have ribs 116 extending lengthwise along the surface of the welding handle 42. Additionally, it is preferred ergonomically that the trigger have a length, L2, of 1.25 to 1.50 inches with a trigger width, TW, of less than 0.92 inches.

Referring generally to FIGS. 9–11, various embodiments of exemplary cross-sectional configurations of the welding handle 42 are illustrated. These embodiments provide improved ergonomics when gripping the welding handle 42. In the first embodiment 42, illustrated in FIGS. 8 and 9, the outer gripping surface 114 is oval shaped and has ribs 116. A cross-sectional view of an alternative welding handle 117 is illustrated in FIG. 10. In this embodiment, the alternative welding handle 117 has a second gripping surface 118. In the illustrated embodiment, the second gripping surface 118 has a more classically oval shape than the first embodiment 114, and does not have ribs 116 on the exterior. However, the second gripping surface 118 may be provided with ribs 116. A third welding handle 119 is illustrated in FIG. 11. In the illustrated embodiment, the third welding handle 119 is configured with a third gripping surface 120. The third gripping surface 120 is teardrop shaped and, also, does not have ribs 116 on the exterior. However, the handle 118 may be provided with ribs 116. The teardrop shape most closely approximates the shape formed by bending a finger, such as the index finger, to the thumb, which is the normal orientation for a user when gripping the welding handle. Additionally, the teardrop shape enables a user to identify a top or a bottom of the handle 120 by gripping the handle.

Additionally, the welding handle 42 may be provided in kit form to enable an existing welding handle to be replaced by one or more of the welding handle embodiments described above. The kit may comprise handle pieces, a trigger, a neck assembly, or any other components that may be suitable.

It will be understood that the foregoing description is of preferred exemplary embodiments of this invention, and that the invention is not limited to the specific forms shown. Modifications may be made in the design and arrangement of the elements without departing from the scope of the invention as expressed in the appended claims.

What is claimed is:

1. A welding system, comprising:
   a cable electrically coupleable to a power source;
   a member secured to the cable; and
   a handle, comprising:
      a first recess operable to receive the member therein in a first direction relative to the handle, wherein the first recess is adapted to restrict movement of the member relative to the handle; and a second recess operable to receive the member therein in a second direction relative to the handle, the second orientation being opposite the first direction, wherein the second recess is adapted to restrict movement of the member relative to the handle.

2. The system as recited in claim 1, comprising:

a neck; and an operating switch secured to the handle to control operation of the system, wherein the handle is adapted to enable the operating switch to be positioned on the handle adjacent to the neck in a first configuration and positioned on the handle adjacent to the cable in a second configuration.

3. The system as recited in claim 1, wherein the handle is substantially straight and has a first end, a second end opposite the first end, and a gripping portion that increases in cross-sectional area in each direction towards the first and second ends.

4. The system as recited in claim 1, comprising a wire feeder electrically coupleable to the power source and adapted to advance electrode wire through the cable.

5. A welding system, comprising:

a welding cable coupleable to an electrical power source;

a welding handle secured to the welding cable, comprising:

a first end;

a second end opposite the first end; and a gripping portion, wherein the gripping portion increases in cross-sectional area from a first location between the first and second ends in each direction to approximately the first and second ends; and a trigger secured within the welding handle between the first end and the second end.

6. The system as recited in claim 5, wherein the welding handle is substantially straight.

7. A welding system, comprising:

a welding cable coupleable to an electrical power source; and a welding handle secured to the welding cable, comprising:

a first end;

a second end opposite the first end, wherein each end of the welding handle is operable to receive the welding cable; and a gripping portion, wherein the gripping portion increases in cross-sectional area from a first location between the first and second ends in each direction to approximately the first and second ends.

8. The system as recited in claim 5, comprising a wire feeder operable to feed electrode wire through the welding cable.

9. A configurable handle for an arc welding system, comprising:

a first receiving portion operable to capture a multi-faceted member of a welding cable with the welding cable oriented in a first direction relative to the handle; and a second receiving portion operable to capture the multi-faceted member of the welding cable with the welding cable oriented in a second direction relative to the handle.

10. The handle as recited in claim 9, wherein the handle comprises a plurality of handle pieces, each handle piece having a first and second receiving region that is adapted to cooperate with a corresponding handle piece to form the first and second receiving portions, respectively, when the plurality of handle pieces are secured together.

11. The handle as recited in claim 9, comprising a trigger switch, wherein the handle is adapted to enable the trigger switch to be disposed on each end of the handle.

12. The handle as recited in claim 9, wherein the handle increases in cross-sectional area from a portion between each end of the handle towards each end of the handle.

13. The handle as recited in claim 9, comprising a gripping portion, wherein the gripping portion has a generally oval-shaped cross-section.

14. The handle as recited in claim 9, comprising a gripping portion, wherein the gripping portion has a generally teardrop-shaped cross-section.

15. The handle as recited in claim 9, wherein the handle generally is straight.

16. A handle for a welding system, comprising:

a first end;

a second end opposite the first end, a gripping portion between the first and second ends, wherein the handle increases in cross-sectional area in each direction from a location approximately midpoint of the gripping portion to the first and second ends; and a portion operable to secure a trigger between the first and second ends.

17. The handle as recited in claim 16, wherein the gripping portion has a generally oval-shaped cross-section.

18. The handle as recited in claim 16, wherein the gripping portion has a generally teardrop-shaped cross-section.

19. The handle as recited in claim 16, wherein the handle is substantially straight relative to an axis through the handle.

20. The handle as recited in claim 16, wherein the handle has a minimum perimeter length around the gripping portion of 4.4 inches.

21. A handle for a welding system, comprising:

a first end;

a second end opposite the first end, wherein the handle has a length of 6.38 inches to 9.50 inches. and a gripping portion between the first and second ends, wherein the gripping portion increases in cross-sectional area in each direction from a location approximately midpoint of the gripping portion to the first and second ends.

22. The handle as recited in claim 21, comprising a trigger, wherein the trigger has a length of 1.25 inches to 1.50 inches.

23. A handle for a welding system, comprising:

a first end;

a second end opposite the first end, and a gripping portion between the first and second ends, wherein the handle increases in cross-sectional area in each direction from a location approximately midpoint of the gripping portion to the first and second ends, and the handle has a perimeter length around the gripping portion of 4.2 inches to 4.6 inches.

24. A method of assembling a configurable welding gun, comprising the acts of:

selecting one of a first and a second end of a configurable welding handle for placement of an operating switch in relation to a neck of the configurable welding handle;

disposing the operating switch in one of a first handle piece and a second handle piece adapted to capture a welding cable member at each of the first and second ends of the configurable welding handle;

disposing a welding cable coupleable to the neck within one of the first and second handle pieces such that the operating switch is oriented at the selected end of the configurable welding handle when the neck is coupled to the welding cable; and securing the first handle piece to the second handle piece.

25. The method as recited in claim 24, further comprising the act of coupling the neck to the welding cable.

26. The method as recited in claim 25, wherein coupling comprises securing the neck directly to the welding cable.

27. A configurable welding gun for an arc welding system, comprising:

a handle securable to a welding cable;

a neck, and a trigger securable to the handle, wherein the handle is adapted to enable the trigger to be positioned in each of four quadrants of the handle relative to the neck.

28. The welding gun as recited in claim 27, wherein the trigger is securable to the handle in a first location and the handle is operable to be secured to the welding cable in a plurality of orientations such that the first location is positionable to each of the four quadrants.

29. A welding gun for an arc welding system, comprising:

a first handle piece;

a second handle piece;

a trigger to control operation of a welding system, the first and second handle pieces being adapted to receive the trigger; and a neck operable to direct a flow of gas therethrough, the first and second handle pieces being positionable relative to the neck to enable the position of the trigger on the welding handle to be varied from a first position to a second position, the second position being directly opposite the first position, wherein the first and second handle pieces are adapted to be gripped by a hand oriented in a constant orientation relative to the neck with the trigger in both the first and second positions.

30. The welding gun as recited in claim 29, wherein the second position is vertical relative to the first position.

* * * * *